3,024,159
INDUSTRIAL PROCESS WATER TREATMENT
Carol H. Bollenback, Palos Park, George R. Hunt, La Grange, and Etsuo Saito and Jerry J. Svarz, Joliet, Ill., assignors to Nalco Chemical Company, a corporation of Delaware
No Drawing. Filed June 2, 1958, Ser. No. 738,917
10 Claims. (Cl. 162—161)

The present invention relates to a process for chemically treating aqueous fluids used in various industrial processes for the purpose of controlling the growth and reproduction of microorganisms. More specifically, the invention is directed to a new class of microbiocidal agents which afford excellent bacteriological control in the paper making processes and are not rendered inactive due to the absorptive properties of cellulose fibers.

The growth of microorganisms in industrial process waters is a problem which occurs in many industries using large quantities of aqueous fluids. The problem occurs in such industrial systems as cooling towers, paper mills, the secondary recovery of petroleum in the process known as water flooding, water wells, and similarly related industrial fluid systems. Most industrial systems of these types obtain their water supplies from many varied sources, and due to economic considerations, it is customary to recirculate and reuse the water. This tends to produce an environment favorable towards the culture and spread of undesirable microorganisms such as the various species of bacteria and fungi.

One of the most acute bacteriological control problems is found in the production of paper. Microbiological slime masses which form in the various parts of the paper making system are recognized as one of the reasons for decreased production, breaks occurring on the machines, and occurrence of the spots and holes in paper. Unless these slime masses are controlled, production is decreased and maintenance costs become excessive.

In order to curtail microbiological phenomena from occurring, it is today a common practice to use chemical treatment to control and mitigate growth of microorganisms which tend to form slimes in the various parts of the paper making plants. Investigations of the slime forming microorganisms have disclosed that numerous varieties of bacteria and fungi are the source of the problem, and it is often necessary to control these organisms by using several different types of microbiocidal agents. It would be extremely advantageous if a single chemical treatment were available which would be able to control the several species of microorganisms commonly occurring in paper mill manufacturing processes whereby these detrimental slime-forming organisms would be controlled or reduced.

Another aspect of the problem of controlling microorganisms in the paper manufacturing industry is that the water used in the paper making process contains quantities of cellulosic materials which vary in concentration from about 0.1%, of which white water is exemplary, all the way up to 15% by weight, which concentrations are fairly common in pulp storage tanks. Many chemical microbiocidal agents have the tendency to be selectively absorbed by the fiber, which means they are no longer capable of effectively acting upon the slime masses. To be really effective in the control of microorganisms in paper mills, it is extremely desirable that a chemical agent is not only active in controlling a large number of species of harmful microorganisms but also such agent should not tend to be absorbed on cellulose fibers.

Another specialized and extremely difficult industrial problem is the control of microorganisms of the sulphate reducing bacteria type which problem is associated with the process known as water flooding. For a more complete understanding of the invention, a brief description of the water flooding process is given below.

When an oil well ceases to flow by the natural pressure in the formation and/or substantial quantities of oil can no longer be obtained by the usual pumping methods, various processes are sometimes used for the treatment of the oil bearing formation in order to increase the flow of oil. These processes are usually described as secondary recovery processes. One such process which is frequently used in the water flooding process wherein water is pumped under pressure into what is called an "injection well," and oil along the quantities of water that have been displaced from the formation are pumped out of an adjacent well which is referred to as a "producing well." The produced oil is then separated from the water that has also been pumped from the producing well. The reclaimed water is then pumped to a storage reservoir from which it can be fed into the injection well. Supplementary water from other sources may also be used in conjunction with the produced water. When the storage reservoir is opened to the atmosphere, and the oil is subject to aeration, this type of water flooding system is often referred to as an "open water flooding system." If the water is recirculated in a closed system without substantial aeration, the secondary recovery method is frequently referred to as a "closed water flooding system."

The water which is introduced into the injection wells may vary considerably in composition from one field to another. Frequently it contains relatively large quantities of dissolved salts such as sodium chloride and, therefore, can be described as a brine. It may also contain other salts such as those of calcium, magnesium, barium, and strontium. Some iron salts may also be present. In some cases these salts are added to fresh water to prevent clay minerals from swelling and to seal porous oil sands, but in most cases, their occurrence is natural.

In the last few years there have been several commercially available bactericidal preparations sold for the specific purpose of controlling sulphate reducing bacteria in water flood operations. These preparations have met with varying measures of success, but they have not been found adequate in controlling sulphate reducing bacteria when the brine content of the injection fluid is relatively high. These high brine water flood liquids usually contain at least 3% or more of dissolved salts and usually will contain from 10% to 30% by weight of dissolved salts and for some unknown reason these high concentrations of inorganic salts tend to render ineffectual many of the well-known microbiocides which are effective in controlling sulphate reducing bacteria under less saline conditions.

Similar conditions exist in many other industrial systems where water tends to flow and is subject to constant environmental change. pH variations, dissolved solid contents, and environmental adaptation of microorganisms tend to make the control of microorganisms extremely difficult in many industrial systems. Many commercially available microbiocides, while being somewhat effective in systems such as are described above, have the disadvantage of being soluble only by careful pH control, or it is necessary to use expensive organic solvents. Several of the commercial microbiocides also have the disadvantage of being expensive materials as well as being extremely difficult to produce.

It would be extremely desirable if a microbiocidal agent were available which would adequately control microorganisms of the types commonly occurring in the aqueous systems such as paper mills, water floods, cooling towers, and the like and also would be relatively economical to produce and use. Another advantage would be a chemical microbiocidal agent which would be effective at extremely low dosages and would be soluble in water. It, therefore, becomes an object of the invention to provide a new and improved class of microbiocides which are useful in the control of various species of microorganisms of the types commonly found in industrial process water systems.

Another object is to furnish new chemical microbiocidal agents which are cheap, relatively simple to prepare, and are effective in controlling a large number of microbiological species at low economical dosages.

A specific object is to provide a new class of microbiocidal agents which are effective in controlling the growth and reproduction of microorganisms of the type often found in paper mills and are not subject to sorption by cellulose fibers.

Another specific object is to provide a microbiocidal agent useful in controlling sulphate-reducing bacteria in water flooding operations, particularly in the presence of high brines. Other objects will appear hereinafter.

In accordance with the invention, it has been found that the growth and reproduction of microorganisms of the types commonly found in industrial process water may be controlled by treating said waters with a small, yet microbiologically active, amount of an acetone of the general formula:

FORMULA I

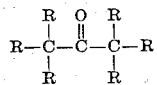

where R above is a member of the class from the group consisting of hydrogen and halogen with the proviso at least one occurrence of R is halogen. The materials of the invention are halogenated acetones. While any halogenated acetone of the type shown in Formula I may be used in the practices of the invention, it has been found that the best results have been obtained using the halogenated acetones containing not more than three atoms of halogen per mole of acetone.

In a specific embodiment of the invention, it has been found that improved results are afforded by using a mixture of halogenated acetones prepared by the room temperature halogenation of acetone with from 0.5 to 4 moles of halogen. The halogen may be either in the form of gaseous halogen or a hypohalite salt. These mixed acetones are simple to manufacture and have the advantage of being as active in their microbiological properties as any of the individual halogenated acetones which they contain.

Commercial expediency dictates that the halogenated acetone preferably be a chloro-acetone although the bromo and iodo acetones work equally well. The amount of halogenated acetone necessary to achieve control of microorganisms will, of course, vary depending upon the particular system treated as well as the types of species found present. In most cases, however, as little as one-half part per million to 25 parts per million will give adequate control although quantities ranging as high as 500 parts per million may be necessary in some cases. Small quantities of the chemical are extremely effective in industrial process systems where the water is recirculated and reused, which means that the quantity of the chemical will gradually build up to a maximum usable and effective treating dosage which may be calculated knowing the specific factors in each particular system.

One of the disadvantages of the halogenated acetones is that they tend to be lachrymatory in concentrated form and care must be used in their handling and feeding. It was discovered that this disadvantage could be readily overcome by converting the halogenated acetones to their bisulfite addition product, which products are shown in general Formula II set forth below:

FORMULA II

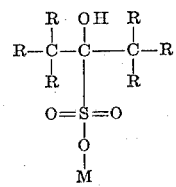

where R has the significance previously shown in Formula I and M represents alkali metal such as sodium, potassium, cesium, lithium and rubidium. These bisulfite addition products are prepared by merely mixing a concentrated aqueous solution of alkali metal bisulfite with the halogenated acetone. The resultant bisulfite addition product produces a product which is completely water soluble at all concentrations. These bisulfite addition products can be made of any halogenated acetone of the types shown. They may also be prepared from the mixed acetones formed by reacting the halogen with acetone at room temperature. To demonstrate the method of preparing the mixed acetones of the type previously described and their bisulfite addition products, the following examples are given by way of illustration.

*Example I*

Seventy-one grams (one mole) of chlorine were bubbled into 56 grams of acetone in a three-necked, round bottom flask fitted with a condenser, addition tube, and a thermometer. The temperature rose to 56° C. from 25° C. in one minute and then gradually to 95° C. in thirty minutes. The crude product weighed 72 grams.

Distillation at atmospheric pressure of the crude material gave the following.

| B.P., °C.: | Weight in grams |
|---|---|
| 56– 60 | 3 |
| 60–117 | 4 |
| 117–120 | 55 |
| 120–169 | 3 |
| 169–172 | 2 |

*Example II*

To ten grams of sodium bisulfite (.096 mole) in five cc. of water were added with stirring ten grams (0.1 mol.) of the product of Example I. The temperature rose to 65° during the addition. The mixture was allowed to cool at room temperature and then dried over concentrated sulfuric acid in a desiccator for two days. Twenty grams of a water soluble powder was obtained.

*Example III*

The same procedure as Example I was used except the molar ratio of chlorine to acetone was 1.48:1.

A more comprehensive discussion of the halogenation of acetone is given in the following references: 26 Ber. 597–598 (1893); 297 Ann. 310–319 (1894), and German Patent 69,039 (1893).

Typical compounds useful in the practice of the invention and referred to by number in subsequent tables are illustrated in Table I below:

TABLE I

| Composition number | Halogenated acetones |
|---|---|
| I | Chloroacetone. |
| II | 1,3-dichloroacetone. |
| III | 1,1-dichloroacetone. |
| IV | Chlorinated acetone of Example I. |
| V | Chlorinated acetone of Example II. |
| VI | 1,3-dibromoacetone. |
| VII | Sodium bisulfite addition compound of Composition III. |
| VIII | Bromoacetone. |

EVALUATION OF INVENTION

In order to determine the efficacy of the invention for treating various types of industrial process water under a wide variety of conditions, several test methods were used. These test methods correlate with conditions existing in many industrial process systems where microbiological problems occur. These test methods are set forth in detail below:

Test Method I

*Gas tube inhibition.*—In this test the culture medium used consisted of 24 grams of dextrose, 1 gram of Basaminbact (Anheuser-Busch), added to one liter of Chicago tap water and sterilized by autoclaving under 15 pounds of pressure for 15 minutes. An appropriate amount of 18 to 24 hour nutrient broth culture of *A. Aerogenes* or *A. niger* was mixed with 200 ml. of the culture medium immediately before starting tests. The amount of culture was such as to give one million organisms per ml. of medium. 20 ml. of the inoculated culture medium was placed in each of a series of fermentation tubes with caps which contained the appropriate concentration of stock chemical to avoid more than a 5% error in final dilution. For this purpose the volume of chemical introduced should be 1 ml. or less. The chemical and the inoculated medium were mixed gently. A control test was also run in which the chemical was omitted. In mixing, each tube was inverted in such a manner as to fill the upright closed end of the tube with the test liquid. The tubes were incubated at 30° C. for 48 hours. At the end of one hour contact and again after 24 hours' contact a loopful of the test mixture was withdrawn from each tube and inoculated in a subculture tube containing 10 ml. of sterile nutrient broth. The subculture tubes were incubated at 37° C. for 48 hours and examined for growth. The results of these tests indicated 1 and 24 hour killing ranges. The gas production for inhibition level was recorded at 48 hours for Aerobacter. Growth inhibition was recorded for *A. niger* after five days.

Test Method I–A

*Gas tube inhibition (turbidity method).*—The turbidity test method is a variation of the gas tube inhibition procedure (Test Method I). Test organisms other than Aerobacter are used in this procedure, e.g., Flavobacterium, Pseudomonas, *B. subtilis*. Aerobacter produces gas from the test medium. The latter organisms do not. Therefore, turbidity is used as evidence of growth of the organisms. Where there is evidence of turbidity caused by a chemical, it is necessary to include uninoculated controls of chemical with the nutrient medium.

Test Method I–B

*Gas tube inhibition in presence of fiber.*—This test is a variation of the gas inhibition test (Test Method I). A 0.2% suspension of unprinted newspaper stock is added to the nutrient broth used in the gas inhibition test. Otherwise the procedure is exactly the same as Test Method I.

Test Method II

*Plate kill.*—This method is described by Bollenback and Cruickshank in Journal of Analytical Chemistry, vol. 26, page 1355, August 1954. In this method the number of parts per million (p.p.m.) of the active compound required to kill *A. aerogenes* in a contact time of one hour is determined using an inoculum prepared by adjusting an 18 to 22-hour broth culture of *A. aerogenes* to approximately two million organisms per ml. in distilled water immediately before use in the test. The adjusted culture is used within five minutes after its preparation and the test is carried out with one ml. of an appropriate inoculum and one ml. of a 0.1% stock solution of the chemical to be tested. The results in terms of active bactericidal ingredients are given in parts per million.

Test Method II–A

*Fiber sorption test.*—Five grams of groundwood pulp is disintegrated in 500 ml. tap water using an Osterizer. The pulp is then separated by passing the pulp suspension through filter paper on a Buchner funnel. The filtrate is saved. The 5 grams of pulp is resuspended in 95 ml. of the filtrate in a wide-mouth Pyrex nursing bottle. One hundred ml. of the filtrate is placed in a second nursing bottle, for control purposes. To each of these is added 1,000 p.p.m. of the chemical to be tested. The bottles are capped, laid on their sides, and gently shaken on a mechanical shaker for 18 hours.

At the end of this period, the contents of each flask is filtered through filter paper on a Buchner funnel.

The filtrates are then tested for bactericidal activity by a dilution technique (Test Method II), e.g., method of Bollenback and Cruickshank, using *Aerobacter aerogenes* as the test organism. The killing levels of the two filtrates are noted and the percent loss of the chemical due to sorption by the fibers is calculated.

Test Method III

SCREENING INHIBITION TEST FOR SULFATE REDUCING BACTERIA

Culture Media:

| | | |
|---|---|---|
| Sodium Lactate (60%) | ml | 4.0 |
| Yeast extract | gram | 1.0 |
| Ascorbic acid | do | 0.1 |
| $MgSO_4 \cdot 7H_2O$ | do | 0.2 |
| $K_2HPO_4$ (Anhydrous) | do | 0.1 |
| $Fe(SO_4)_2(NH_4)_2 \cdot 6H_2O$ | do | 0.1 |
| NaCl | do | 10.0 |
| Deionized water | ml | 1000.0 |

The ingredients were dissolved by stirring and the pH was adjusted to 7.2–7.5 with 6 N NaOH. The media was then autoclaved at 15 lb./15 minutes and was ready for use in the test.

The organisms were a culture of sulfate reducers (Desulfovibrio) that were obtained from the American Petroleum Institute and were designated as API–A culture. The inocula for the tests were from the third successive 24-hour transfer, and showed blackening after each 24-hour transfer.

Stock solutions of the bacteriostat to be screened were prepared as 0.9% solutions by weight in ethanol. On the day of the test, 0.09% solutions by volume were prepared in deionized water from the stock solutions and were the working solutions for the tests.

To sterile 18-ml. screw-capped test tubes, sufficient amounts of the chemicals being tested were added to give the desired concentration of bacteriostat in 18 ml. Room-temperature media containing 10 ml. of culture per liter was carefully poured into the screw-capped tubes to completely fill them. Duplicate tubes were prepared in every dilution in addition to a control tube which contains no chemical. The tubes were tightly capped so that air was excluded.

The tubes were incubated at 37° C. for 7 days and then observed for results. Growth of the sulfate reducers was evidenced by intense blackening of the tubes, while inhibition of growth showed no change in appearance.

The desired concentrations of chemicals were obtained in the 18-ml. tubes by adding the following amounts from the 0.09% solutions.

| Concentration (p.p.m.): | Amount of solution, ml. |
|---|---|
| 100 | 2.0 |
| 50 | 1.0 |
| 40 | 0.8 |
| 30 | 0.6 |
| 20 | 0.4 |
| 10 | 0.2 |
| 5 | 0.1 |
| 1 | 0.02 |

With the above-described test methods, several of the compositions of the invention were tested to determine their activity. These results are set forth in Tables II through V inclusive. In the case of the bisulfite addition products, dosages were based on the halogenated acetone per se.

TABLE II

| Bacteria species | Comp. No. | Test method No. | 1-hr. kill (in p.p.m.) | 24-hr. kill (in p.p.m.) | Inhibition (in p.p.m.) |
|---|---|---|---|---|---|
| Aa [1] | I | I | >200(10)* | 100-200(12)* | 10-25(14)* |
| An [2] | I | I | >200(5)* | 25-50(5)* | 5-10(8)* |
| Aa [1] | II | I | >200(8)* | 25-50(9)* | 5-10(10)* |
| An [2] | II | I | >200(6)* | 10-25(6)* | 10-25(9)* |
| Aa [1] | IV | I | >200(6)* | 25-50(6)* | 5-10(8)* |
| An [2] | IV | I | >200(8)* | 25-50(10)* | 5-10(8)* |
| Aa [1] | VIII | I | | | 1-2(1)* |
| Flavo.[3] | I | I-A | | | 10-25(5)* |
| Pseudo.[4] | I | I-A | | | 10-25(5)* |
| Subt.[5] | I | I-A | | | 50-100(5)* |
| Flavo.[3] | II | I-A | | | 1-2(5)* |
| Pseudo.[4] | II | I-A | | | 5-10(5)* |
| Subt.[5] | II | I-A | | | 25-50(5)* |
| Flavo.[3] | IV | I-A | | | 10-25(8)* |
| Pseudo.[4] | IV | I-A | | | 5-10(10)* |
| Subt.[5] | IV | I-A | | | 50-100(12)* |
| Rhodo.[6] | IV | I-A | >200(1)* | 5-10(1)* | 5-10(1)* |
| Wh. Mon.[7] | IV | I-A | >200(1)* | 10-25(1)* | 10-25(1)* |
| T.l.[8] | IV | I-A | >200(1)* | 50-100(1)* | 25-50(1)* |
| A. flavo-oryzae [9] | IV | I-A | >200(1)* | 10-25(1)* | 10-25(1)* |

[1] Aa=*Aerobacter aerogenes*
[2] An=*Aspergillus niger*
[3] Flavo=*Flavobacterium brevis*
[4] Pseudo=*Pseudomonas aeruginosa*
[5] Subt=*Bacillus subtilis*
[6] Rhodo=*Rhodotorula sp.*
[7] Wh. Mon.=White monilia
[8] T.l.=*Trichoderma lignorum*
[9] A. flavus-oryzae=*Aspergillus flavus-oryzae*
*Number in parentheses indicates number of tests run to establish the range.

TABLE III

EFFECT OF pH ON INHIBITION TESTS

[Test species *Aerobacter aerogenes*]

| Comp. No. | Test method No. | pH | Killing range (in p.p.m.) | Inhibition range (in p.p.m.) |
|---|---|---|---|---|
| I | II | 5 | >100(4)* | |
| I | I | 5 | | 10-25(4)* |
| I | II | 8 | >200(4)* | |
| I | I | 8 | | 10-25(4)* |
| II | II | 5 | 10-25(4)* | |
| II | I | 5 | 50-100(4)* | |
| II | II | 8 | | 2-5(4)* |
| II | I | 8 | | 25-50* |
| IV | II | 5 | 50-100(6)* | |
| IV | I | 5 | | 5-10(7)* |
| IV | II | 8 | 100-200(7)* | |
| IV | I | 8 | | 10-25(7)* |

* Number in parentheses indicates number of tests run to establish the range.

TABLE IV

ACTIVITY IN PRESENCE OF FIBER

[Test species is *Aerobacter aerogenes*]

| Composition number | Test method | Blank (in p.p.m.) | Inhibition (in p.p.m.) | Percent retained on fiber |
|---|---|---|---|---|
| I | I-B | 10-25(3)+ | 10-25(3)+ | |
| II | I-B | 5-10(3)+ | 5-10(3)+ | |
| I | II-A | | | 25 |
| II | II-A | | | 0 |
| IV | II-A | | | 0 |
| Phenylmercuric acetate | II-A | | | 92 |
| Sodium 2,4,5-tri-chlorophenate | II-A | | | 98 |
| Sodium pentachlorophenate | II-A | | | 98.4 |
| 3,5-dimethyltetrahydro-1,3,5.2H-thiadiazine-2-thione (Craq 974) | II-A | | | 50 |

+ Number in parentheses indicates number of tests run to establish the inhibition range.

TABLE V

INHIBITION TESTS AGAINST SULFATE REDUCING BACTERIA

| Composition number | Test method | Inhibition range (p.p.m.) | |
|---|---|---|---|
| | | 1% brine | 10% brine |
| I | III | 10-20 | 5-10 |
| II | III | 10-20 | 5-10 |

Table No. II shows the halogenated acetones to be extremely effective in inhibiting the growth of a large number and variety of bacteria and fungi. This test strikingly indicates how effective these compositions are for the treatment of paper mill process waters. Such organisms as *Aerobacter aerogenes* and *Flavobacterium brevis* are frequently found in many paper mill systems; inhibition is accomplished using relatively minor amounts of the halogenated acetone.

Table No. III points out the effectiveness of the compositions of the invention in treating bacteria under both alkaline and acidic conditions. The compositions of the invention are slightly more effective in an acid medium, although protection is still afforded even under alkaline conditions using slightly larger amounts of treatment.

Table No. IV demonstrates the effectiveness of the compositions of the invention when tested in the presence of fiber. For purposes of comparison, several well-known industrial microbiocides were run against the compositions, with the test results indicating that large quantities of these commercial products are absorbed on fibers. The tests shown in Table IV simulate conditions similar to those encountered in paper mill applications where microbiological growth occurs in the presence of fibrous suspensions such as occur in head boxes, machine chests and the like.

Table No. V indicates the efficacy of the compositions used in the practice of the invention to control sulfate-reducing bacteria in the presence of concentrated brines. It is believed to be well known that most commercial inhibitors are completely ineffective in controlling sulfate-reducing bacteria when such bacteria grows in the presence of brines containing 3% or more of dissolved solids.

The expressions, "microbiocidal agent" or "microbiocide," as used herein is meant to include the killing and/or inhibiting action of chemical substances on such microorganisms as, for instance, bacteria, fungi, algae, protozoa, and the like.

Having thus described our invention, it is claimed:

1. The method of controlling the growth and reproduction of microorganisms which comprises feeding from .5–500 parts per million of a halogenated acetone alkali metal bisulfite addition product having the formula:

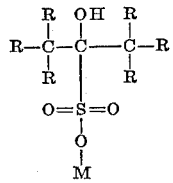

where R is a member of the class from the group consisting of hydrogen and halogen with the proviso that at least one occurrence of R is halogen and M is alkali metal, said feeding being from a supply source of said halogenated acetone alkali metal bisulfite addition product into an aqueous industrial process system containing bacteria from the group consisting of *Aerobacter aerogenes*, *Flavobacterium brevis* and *Desulfovibrio*.

2. The method of claim 1 where the halogenated acetone alkali metal bisulfite addition product is the sodium bisulfite addition product of 1,3-dichloroacetone.

3. The method of claim 1 where the halogenated acetone alkali metal bisulfite addition product is the sodium bisulfite addition product of 1,1-dichloroacetone.

4. The method of claim 1 where the halogenated acetone alkali metal bisulfite addition product is the sodium bisulfite addition product of chloroacetone.

5. The method of claim 1 where the halogenated acetone alkali metal bisulfite addition product is the sodium bisulfite addition product of a mixture of chlorinated acetones produced by reacting acetone with from 0.5 to 4 moles of chlorine per mole of acetone.

6. An aqueous suspension comprising water which contains from 0.1% to 15% by weight of suspended cellulose fibers and a biologically active amount of a halogenated acetone alkali metal bisulfite addition product having the formula:

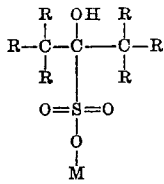

where R is a member of the class from the group consisting of hydrogen and halogen with the proviso at least one occurrence of R is halogen and M is alkali metal.

7. The aqueous suspension of claim 6 where the halogenated acetone alkali metal bisulfite addition product is the sodium bisulfite addition product of 1,3-dichloroacetone.

8. The aqueous suspension of claim 6 where the halogenated acetone alkali metal bisulfite addition product is the sodium bisulfite addition product of 1,1-dichloroacetone.

9. The aqueous suspension of claim 6 where the halogenated alkali metal bisulfite addition product is the sodium bisulfite addition product of chloroacetone.

10. The aqueous suspension of claim 6 where the halogenated alkali metal bisulfite addition product is the sodium bisulfite addition product of a mixture of chlorinated acetones produced by reacting acetone with from 0.5 to 4 moles of chlorine per mole of acetone.

References Cited in the file of this patent

UNITED STATES PATENTS

| | | |
|---|---|---|
| 1,816,441 | Peet | July 28, 1931 |
| 2,338,791 | Weedon | Jan. 11, 1944 |
| 2,684,924 | Rose et al. | July 27, 1954 |
| 2,763,097 | Meuli | Sept. 18, 1956 |
| 2,853,528 | Wojcik | Sept. 23, 1958 |
| 2,901,394 | Rosher | Aug. 25, 1959 |